Patented Oct. 23, 1951

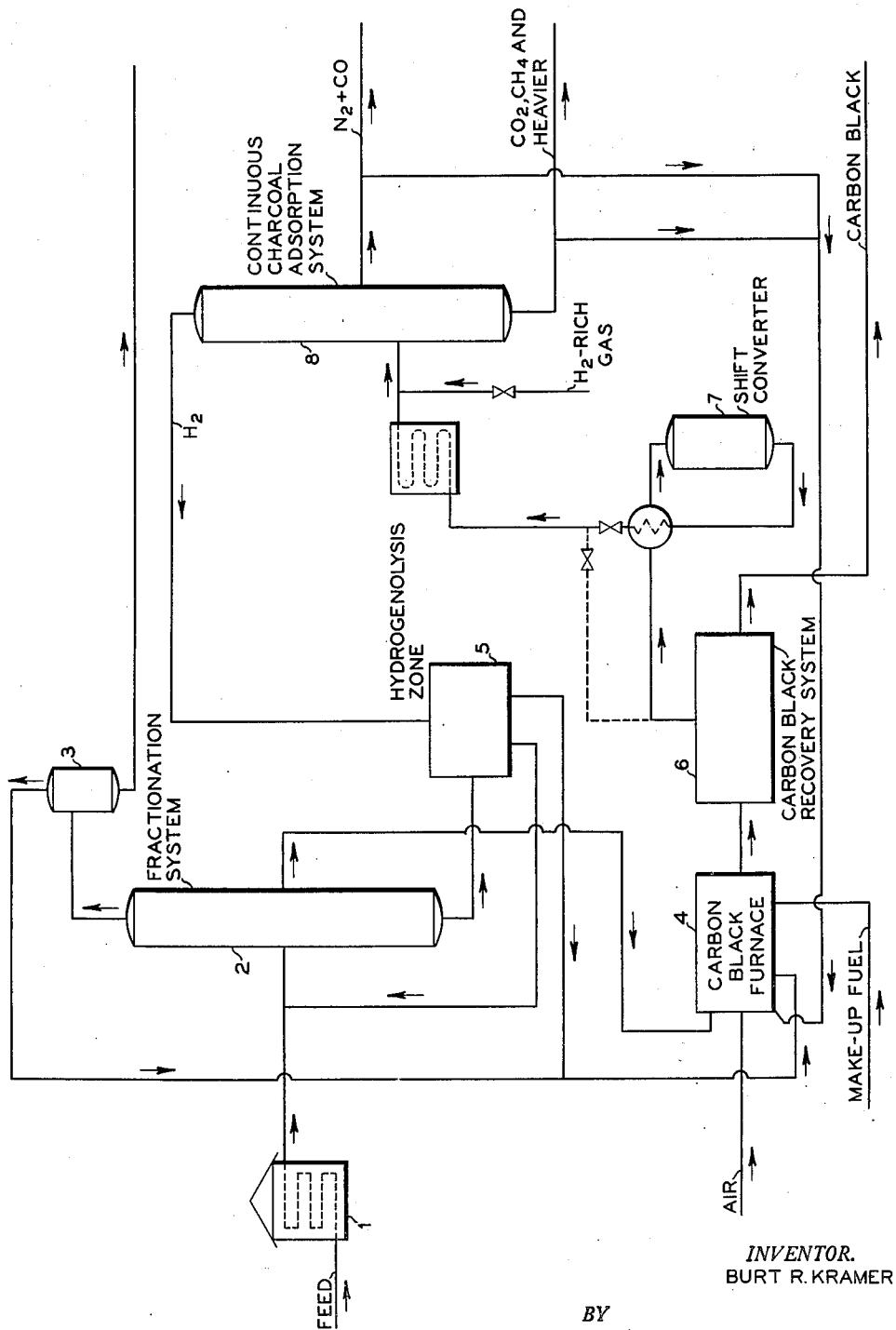

2,572,734

UNITED STATES PATENT OFFICE 2,572,734

PRODUCTION OF CARBON BLACK FROM HIGH-BOILING AROMATIC OILS OR TARS

Burt R. Kramer, Bartlesville, Okla., assignor to Phillips Petroleum Company, a corporation of Delaware Application December 16, 1949, Serial No. 133,252

3 Claims. (Cl. 23—209.6)

1

This invention relates to a process for the production of a high grade carbon black. In one of its aspects it relates to the production of carbon black from heavy, high boiling range aromatic oils and tars which are obtained from various petroleum oil refining processes. In another of its aspects this invention relates to the production, in an integrated process, of carbon black from heavy, high boiling range aromatic and residual oils in a greatly simplified combination of steps in respect of those which otherwise would be required to produce a carbon black from the same starting material. In a further aspect the invention relates to an integrated process which recovers substantially completely all utilizable portions of the charging stocks or discharges the same in utilizable condition as will be apparent from the following description. In a still further aspect of the invention, it relates to a combination of steps including the employment of a tangential burner, reactor or furnace for the production of carbon black from heavy, high boiling range or residue oils with utilization of all or substantially all of the gases formed in the process or their discharge in utilizable condition as will appear from study of the following description. In order to produce a high grade carbon black from the aforesaid oils, which can be produced by thermal and catalytic cracking, reforming and polyforming and other conversion processes, it is preferred to select the fraction boiling in the range 400° to 700° F.

There has been available heretofore no process which could start with a broad fraction of heavy cyclic and aromatic refractory cycle stock or oil to produce carbon black from substantially the entire quantity. This invention provides a process which makes use of such a starting material in its substantial entirety.

Thus, it is among the objects of this invention to so combine certain steps to act upon a heavy, high boiling range aromatic or residual oil, or tar, as to produce a carbon black in a unitary or integrated process with simplicity yet greatest or maximum utilization of materials formed during the operation or their recovery in utilizable form.

Also among the objects of this invention is to so combine certain steps to act upon a heavy, high boiling range cyclic or aromatic stock or oil as to produce a carbon black in a unitary or integrated process enabling the use of said starting oil in its substantial entirety.

Other objects as well as advantages of the invention are apparent from a study of this disclosure, the appended claims and the drawing.

2

According to this invention there is provided a process for the production of carbon black which comprises in a fractionation zone fractionating a heavy, high boiling aromatic oil from a petroleum refining process to produce a fraction boiling in the approximate range 400° F.–700° F. and a fraction boiling above about 700° F.; in a hydrogenolysis zone subjecting said fraction boiling above about 700° F. to destructive hydrogenation to produce therefrom an oil boiling in said approximate range of 400°–700° F.; passing said hydrogenolysed oil to said fractionation zone; passing said fraction boiling in the approximate range 400° F.–700° F. to a tangential burner, carbon black producing zone, and producing carbon black therefrom therein; quenching the effluent from the tangential burner zone and separating gases therefrom; removing carbon black product from the process; passing said gases to a shift converter at a temperature in the approximate range of 700° F.–900° F. to convert carbon monoxide and water therein to hydrogen and carbon dioxide; separating the hydrogen from the rest of the gases and passing it to said hydrogenolysis zone.

The drawing shows diagrammatically the flow of materials in an embodiment according to the invention.

An aromatic charge stock, as described herein, is heated in furnace heater 1 to the desired temperature and subjected to fractionation in fractionation zone 2. The temperatures of heating and fractionation are such that any naphtha in the oil fraction will pass overhead and will be recovered in utilizable form from the bottom of gas separator 3 while gases which may have been dissolved in the oil, or formed during its heating, are removed overhead from gas separator 3 and are passed to the tangential burner as fuel. The desired fraction boiling in the approximate range 400° F.–700° F. is withdrawn from zone 2 at a midpoint thereof and passed to a tangential burner furnace system 4 to be converted to carbon black. Air is used to supply oxygen required to operate the tangential burner system. It is within the scope of this invention to supply oxygen in place of the air. When this is done, nitrogen is eliminated from the system. An advantage of such procedure is the easier recovery of hydrogen which results. Bottoms from zone 2 are passed to hydrogenolysis zone 5 wherein these are converted to hydrocarbons boiling in said range of 400°–700° F. Liquid products from zone 5 are returned to zone 2 for fractionation and gaseous products are passed to the tangential burner as fuel.

The conditions for hydrogenolysis of a heavy, high boiling aromatic oil are known in the art and are usually about a temperature in the range 800°–900° F., or thereabouts under a pressure of hydrogen of at least 20 atmospheres or more up to about 400 atmospheres and, in some cases, even higher. The reactions are timed to yield the desired product which in this case is an aromatic oil boiling in the approximate range of 400°–700° F.

The operation of a tangential burner for the production of carbon black is set forth in U. S. Patent 2,375,796 to Joseph C. Krejci, dated May 15, 1945.

The effluent from the burner 4 is then quenched in zone 6 following which the carbon black produced is removed from the system and gases in the quenched stream are heated to 700° F.–900° F. and passed to a shift converter zone 7.

In zone 7 the gases, which contain large quantities of hydrogen, carbon monoxide and carbon dioxide, diluted with nitrogen, and containing an excess of water vapor, are converted to contain a higher concentration of hydrogen, carbon dioxide, nitrogen and minor quantities of unreacted carbon monoxide, methane, and heavier hydrocarbon gases and water vapor. The converted gas stream is then treated in an adsorption-desorption unit 8 to separate a substantially pure hydrogen gas, which is passed to hydrogenolysis step 5, nitrogen and carbon monoxide, at least a part of which is used as diluent in burner zone 4. Carbon dioxide and the hydrocarbons are removed from zone 8 and passed to the burner zone 4 as a diluent and as a secondary fuel.

The conditions to be employed in the shift converter zone 7 are well known in the art and can be determined for each gas stream by mere test. As a modification of the invention, as described in connection with the drawing, it is possible to by-pass zone 7, as shown by the broken line, passing the gases directly to zone 8. Also, hydrogen-rich gas from an external source can be introduced to the charcoal absorption system, as indicated.

Reasonable variation and modification are possible within the scope of the foregoing disclosure and the appended claims to the invention the essence of which is that a series of steps have been so combined as to produce in a unitary process a carbon black from a heavy, high boiling aromatic oil or tar, as described.

I claim:

1. A process for the production of a high grade carbon black which comprises in a fractionation zone fractionating a heavy, high boiling aromatic oil derived from a petroleum process, to produce a fraction boiling substantially in the range 400° F.–700° F. and a higher boiling fraction, hydrogenating said higher boiling fraction in a hydrogenolysis zone to produce a fraction boiling in said range of 400° F.–700° F.; passing said treated oil to said fractionation zone; passing said fraction boiling substantially in the range 400° F.–700° F. to a tangential furnace carbon black producing zone; producing carbon black and gases containing hydrogen, carbon monoxide, and carbon dioxide therefrom therein; quenching the effluent from said tangential burner zone and separating gases therefrom; removing carbon black product from the process; and separating said hydrogen from said gases and passing it to said hydrogenolysis zone.

2. A process for the production of a high grade carbon black which comprises in a fractionation zone fractionating a heavy, high boiling aromatic oil derived from a petroleum process, to produce a fraction boiling substantially in the range 400° F.–700° F. and a higher boiling fraction, hydrogenating said higher boiling fraction in a hydrogenolysis zone to produce a fraction boiling in said range of 400° F.–700° F.; passing said treated oil to said fractionation zone; passing said fraction boiling substantially in the range 400° F.–700° F. to a tangential furnace, carbon black producing zone; producing carbon black and gases containing hydrogen, carbon monoxide, and carbon dioxide therefrom therein; quenching the effluent from said tangential burner zone and separating said gases therefrom; removing carbon black product from the process; passing said gases to a shift converter zone at a temperature in the approximate range from 700° F.–900° F. to convert carbon monoxide and water therein to hydrogen and carbon dioxide; separating the hydrogen from the rest of the gases and passing it to said hydrogenolysis zone.

3. The process of claim 2 wherein the gases from the shift converter zone are treated to remove hydrogen therefrom and then are used as a diluent and fuel in the tangential burner system.

BURT R. KRAMER.

REFERENCES CITED

The following references are of record in the file of this patent:

UNITED STATES PATENTS

| Number | Name | Date |
|---|---|---|
| 1,902,797 | Burke | Mar. 21, 1933 |
| 1,949,230 | Young | Feb. 27, 1934 |
| 2,116,848 | Reed | May 10, 1938 |
| 2,138,249 | Wilcox | Nov. 29, 1938 |
| 2,322,989 | Wilcox | June 29, 1943 |
| 2,375,796 | Krejci | May 15, 1945 |
| 2,499,438 | Wiegand et al. | Mar. 7, 1950 |
| 2,516,134 | Molique | July 25, 1950 |